United States Patent [19]

Boyadjiev

[11] Patent Number: 4,551,252
[45] Date of Patent: Nov. 5, 1985

[54] METHOD OF AND APPARATUS FOR MASS TRANSFER BETWEEN THREE LIQUID PHASES

[75] Inventor: Lyubomir A. Boyadjiev, Sofia, Bulgaria

[73] Assignee: Edinen Centar Po Chimia, Sofia, Bulgaria

[21] Appl. No.: 451,335

[22] Filed: Dec. 20, 1982

[30] Foreign Application Priority Data

Dec. 18, 1981 [BG] Bulgaria .................................. 54604

[51] Int. Cl.$^4$ ........................ B01D 11/04; B01D 13/00
[52] U.S. Cl. ................................ 210/638; 210/321.1; 210/644; 422/257
[58] Field of Search .................. 210/644, 321.1, 321.2; 422/256, 257

[56] References Cited

U.S. PATENT DOCUMENTS

| | | | |
|---|---|---|---|
| 2,472,578 | 6/1949 | Ferris et al. | 422/257 X |
| 2,681,269 | 6/1954 | Bergstrom | 422/257 |
| 3,585,005 | 6/1971 | Coggan | 422/257 |
| 4,219,422 | 8/1980 | Knothe et al. | 210/137 |

Primary Examiner—Donald R. Valentine

[57] ABSTRACT

Method of and apparatus for the mass transfer between three liquid phases wherein two phases are miscible and the other one of said phases is immiscible with the other two phases and serves as an intermediate phase. The method comprises flowing the two miscible liquids in a capillary-gravitational mode down surfaces which are wettable by said immiscible liquid, said surfaces being separated by a space occupied by the third, intermediate phase, said third phase being forcibly circulated in a direction which is countercurrent with respect to the other two phases. The apparatus comprises a housing containing a package of alternating film carriers and distributors for the treated phase and the receiving phase, respectively, and discharge collectors for the treated phase and the receiving phase, respectively, said distributors being located at the top end and said collectors being located at the bottom end of the housing, respectively.

5 Claims, 1 Drawing Figure

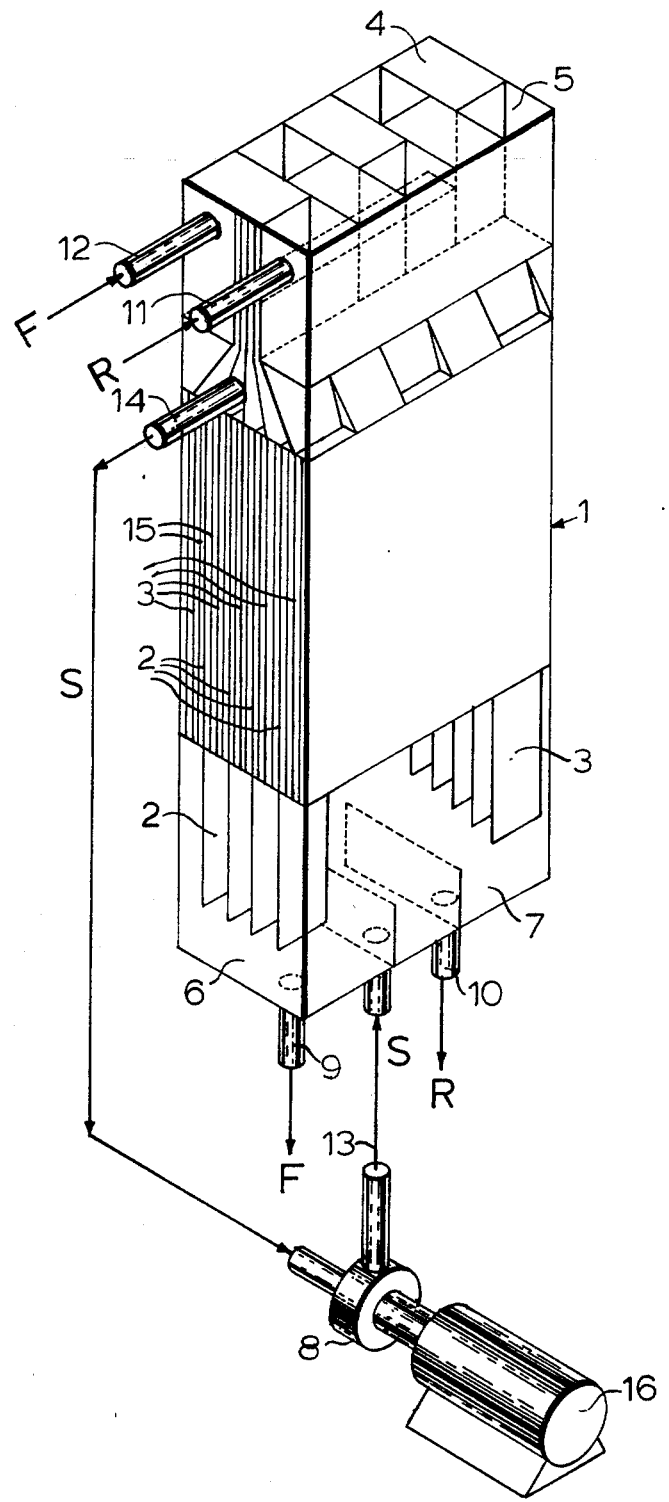

METHOD OF AND APPARATUS FOR MASS TRANSFER BETWEEN THREE LIQUID PHASES

This invention relates to a method of and apparatus for mass transfer between three liquid phases. The invention is applicable for the extraction of solutes from their solutions in such fields as hydrometallurgy, galvanotechnics, the chemical industry, biotechnology, the food industry, waste water treatment, medical industry, etc.

In the following discussion of the prior art, reference is made to eight publications, referred to by number, which are set forth on the attached page entitled REFERENCES.

A method is known for the simultaneous contacting and mass transfer between three liquids wherein the one of the two phases is finely dispersed in the intermediate phase due to the formation of a stable microemulsion. Said emulsion is used in the treatment of the third phase. Such method is disclosed in References 1, 2 and 3.

The disadvantages of this method consist in that the process of stabilization of the emulsion requires the application of an emulsifier, thereby requiring two additional operations, i.e. the formation of the microemulsion, and its destruction upon completion of the main separation process. Moreover, this method cannot ensure a complete physical separation of the two miscible phases, and their partial mixing reduces the efficiency of the desired separation (extraction).

Another method is described in References 3, 4 and 5; in such other method the exchange between the two phases is accomplished by the continuous contacting of said phases with the carrier phase, said carrier phase being circulated between two chambers separated by a porous wall pervious only to the carrier phase and not to the other two phases, each which is dispersed in its own chamber.

It is a disadvantage of such latter method that the properties of the porous wall change with time, so that the wall also becomes pervious to the other two phases. Moreover, this method cannot ensure a complete physical separation of the two miscible phases, and their partial mixing reduces the efficiency of the desired separation (extraction).

A third method is described in References 3, 6 and 7. In such third method the two mass exchanging phases are separated by cellular polymeric or other membrane therebetween which is soaked with the carrier phase. It is a disadvantage of this method that, due to the limited relatively active interphase surface, the rates of transfer are very low and the coefficients of mass transfer through the liquid stagnated within the pores of the membrane are also low.

In Reference 8 an apparatus is known for the separation of liquid-liquid dispersions which includes three successive separation layers wherein the first layer coalesces, the second layer is foam destructive, and the third layer takes away the dispersed phase.

It is a disadvantage of such apparatus that it possesses a relatively low efficiency, and that the process taking place in the apparatus is uncontrollable.

The present invention has among its objects the provision of a method of and an apparatus for mass transfer between three liquid phases ensuring the complete absence of mechanical admixing of the two aqueous phases, a high intensity of mass transfer, and a high efficiency of extraction of solutes from their solutions.

This object is attained by a method of mass transfer between three phases in accordance with the present invention, wherein one of said phases is immiscible with respect to the other two, and serves as the intermediate or third phase (phase S), and the two miscible liquids flow down solid surfaces which are wettable by said liquids, that is, are hydrophilic, and are separated by a space occupied by the third phase (the intermediate phase). The transfer process is supplementarily intensified by setting the third phase into forced motion.

The apparatus of the invention includes a body containing a package of alternating film carriers, tanks for the distribution of liquids fed into the apparatus, and collectors for collecting and discharging the solutions fed out of the apparatus.

The film carriers can be arranged in a flat-parallel or concentric manner, and serve to take up, transport, and discharge the two aqueous liquid phases; said aqueous phases flow down as films in a capillary-gravitation mode. The space between the flowing aqueous film is occupied by the third phase, the organic phase S. The film carriers are wettable only by the liquid phase which is subject to extraction, i.e. the phase F, and, respectively, by the receiving (stripping) phase (phase R). The levels of the two aqueous phases F and R in the collectors are maintained at the desired height by a level leg provided for both outflowing phases.

The advantages of the method and apparatus according to the invention are as follows:
- the complete absence of contact and thus of mechanical intermixing between the two aqueous phases F and R,
- a high intensity of mass transfer between the three flowing liquid films which possess large interfacial areas,
- a high efficiency of the extraction process, said efficiency being controlled by the time of residence of the creeping films whereupon the solid surfaces, and by the motions of the intermediate phase,
- the possibility of using as the intermediate phase non-typical extracting agents or neutral liquids with minor additives of liquid or solid high selective carrier agents,
- the possibility to scale up the apparatus since increasing of the output thereof is in proportion to the width and number of the film carriers which are employed.

The apparatus of the invention is shown in a preferred embodiment thereof in the drawing, in which:

The single FIGURE of the drawing is a schematic diagram in perspective of the apparatus.

The apparatus includes a housing 1, a package of alternating film carriers 2 and 3, a separating net 15, a distribution tank 4 for the treated aqueous phase, a distribution tank 5 for the receiving phase, a discharge collector 6 for the treated phase, a discharge collector 7 for the concentrated product solution, a circulation pump 8 driven by a motor 16, an outlet nozzle 9 for phase F, an outlet nozzle 10 for the receiving solution R, an inlet nozzle 11 for phase R, an inlet nozzle 12 for phase F, a distribution for the organic phase 13 and an outlet nozzle 14 for the organic phase S.

The apparatus operates as follows: treated phase F enters the distribution tank 4 from which it flows in a capillary-gravitation mode in which it flows down along vertically arranged textile hydrophilic surfaces, and is collected in the collector 6 from which it is discharged through nozzle 9.

Similarly, the receiving solution flows from the distribution tank 5 in a capillary-gravitation mode down the other hydrophilic surfaces, and leaves the apparatus through the outlet nozzle 10 for phase F. The space between the hydrophilic or hydrophilized surfaces is filled up by the intermediate organic phase (S). Shaped separating nets 15 are used to separate said surfaces. The centrifugal pump 8 is used to circulate phase S, as indicated in the drawing.

The following non-limiting examples are illustrative of the invention.

EXAMPLE 1

An aqueous solution of zinc sulphate with 0.24 g/l initial zinc content (phase F) flows in a capillary mode down two hydrophilic cloths at a rate of 100 cm$^3$/h. A 10% solution of sulphuric acid (phase R) flows at a rate of 6 cm$^3$/h down other surfaces disposed in alternation with the first surfaces. The compartment between the hydrophilic surfaces is separated by nets and is filled with a 2% solution of diethylhexyl phosphoric acid in liquid paraffins contained from 9 to 13 carbon atoms (phase S). A solution containing 0.023 g/l of zinc and a second solution containing 3.5 g/l of zinc or solution containing 0.002 g/l of zinc or a second solution containing 3.9 g/l of zinc are obtained at the outlet of the apparatus in th absence of, or in the presence of, circulation of the organic phase respectively. The efficiencies in such respective modes of operation are 89% and 92.2%.

EXAMPLE 2

Using the same procedure as in Example 1, an inlet solutions containing 100 mg/l of phenol and a 4% solution of sodium hydroxide, respectively, there were obtained outlet solutions which represent a solution of 90% reduced phenol content, and a solution containing about 2 g/l of sodium phenolate. The organic phase used in this case is normal paraffins ($C_9$–$C_{13}$) without any additives.

EXAMPLE 3

A solution containing 0.200 g/l of copper, 0.130 g/l of cobalt, and 0.130 g/l of magnesium is treated at a flow rate of 350 cm$^3$/h in a device provided with three hydrophilic cloths and four cotton cloths for the phases F and R, respectively, a solution of sulphuric acid having a concentration of 140 g/l circulated at a flow rate of 5.5 cm$^3$/h serves as the receiving phase R. The organic phase S in a volume of 750 cm$^3$ containing 1% of complexing agent (orthononylsalicyl aldoxime) is circulated at a minimal rate of 0.4 cm/sec. Leaving the device, treated aqueous phase (phase F) contains 0.004 g/l of copper 0.129 g/l of cobalt, and 0.130 g/l of megnesium. The receiving phase (R) contains 12 g/l of copper, 0.001 g/l of cobalt and traces of magnesium. Thus a 98% selective extraction of copper is achieved, and a concentrated sulphuric acid solution of said metal free of impurities is obtained.

EXAMPLE 4

Weak acidic water (pH=3.5) containing 0.120 g/l of lead (phase F) and a 2N aqueous solution of nitric acid (phase R) are fed into the device simultaneously and continuously at a flow rate ratio of 40:1. A 5% solution of a mixture in 1:1 ratio of oleic and linolic acid in normal paraffins ($C_{13}$–$C_{15}$) serves as the intermediate phase (S). The two phases (F and R) leave the device also in a ratio of 40:1 with their lead content being 0.00024 g/l and 4.8 g/l, respectively. A 99.8% efficiency is achieved.

EXAMPLE 5

A weak alkaline aqueous solution of ammonia (phase F) of 0.45 g/l ammonia content and 1N aqueous solution of sulphuric acid (phase R) are fed into the device simultaneously and continuously in a flow rate ratio of 15:1. Normal paraffin ($C_{13}$–$C_{15}$) serve as the intermediate phase (S). The ammonia content in the F phase at the device outlet is reduced to 0.04 g/l.

EXAMPLE 6

A weak acidic (pH=5.2) aqueous solution of copper sulphate (phase F) containing 200 mg/l of copper is fed into the device and is contacted with an intermediate phase (S) which consists of a 5% solution of 1:1 mixture of linolic and oleic acid in normal paraffins ($C_{13}$–$C_{15}$). A 2N aqueous solution of nitric acid used as the phase R (i.e. receiving phase) is passed through the device also. The phase ratio F:R is 40:1. A 99.5% efficiency of copper extraction is achieved.

EXAMPLE 7

Industrial waters containing 0.250 g/l of cobalt (phase F) are passed through the device simultaneously with a 8% solution of sulfuric acid (phase R) with the flow rate of the solution being 30 times lower than that of the waters. A 2% solution of diethylhexyl phosphoric acid in kerosene serves as the intermediate phase (S). The outlet solutions consist in treated waters containing less than 0.005 g/l of cobalt and a concentrated (more than 7 g/l) in cobalt solution of sulphuric acid, respectively.

EXAMPLE 8

Waste rinse waters containing 50 mg/l of cadmium at pH=6 (phase F) are passed through the device continuously and simultaneously with the receiving phase (R) representing a 10% aqueous solution of sulphuric acid. The intermediate phase (S) is a 5% solution of 1:1 mixture of oleic and linolic acid in normal paraffins ($C_{13}$–$C_{15}$). With the phase ratio F:R=18, the treated waters which leave the device contain less than 0.1 mg/l of cadmium.

EXAMPLE 9

An aqueous solution of benzoic acid (phase F) of 0.1 g/l concentration is passed through the device continuously and in parallel with an aqueous solution of sodium hydroxide of 20 g/l concentration with the flow rate of latter being 40 times lower than that of phase F. Kerosene serves as the intermediate phase (S).

EXAMPLE 10

Natural waters containing 40 mg/l of elemental iodine (phase F) are passed through the device in parallel and simultaneously with a 4% aqueous solution of sodium hydroxide (phase R) in the presence of hexane as the intermediate phase (S) with the flow rate of phase R being 30 times lower than that of phase F. The iodine content of outlet waters is less than 1 mg/l.

EXAMPLE 11

Acidic natural waters containing 60 mg/l of boron (phase F) are passed through the device in parallel and simultaneously with an aqueous solution of sodium hydroxide (phase R) at a flow rate ratio of 40:1, respectively. A reduction of boron content in the F phase to 12 mg/l is achieved and a sodium tetraborate rich alkaline solution is obtained.

EXAMPLE 12

Acidic waters containing about 5 g/l of nitric acid (phase F) are passed through the device in parallel and simultaneously with the R phase which consists of a 10% aqueous solution of sodium hydroxide. The flow rate ratio of the two phases is F:R=50. As an intermediate phase (S) a 2% solution of tributyl phosphate in normal paraffins ($C_{13}$-$C_{15}$) is used. The acid content of the outlet water is 0.045 g/l.

EXAMPLE 13

Acidic rinse waters (phase F) containing chromium (VI) in anionic form at a 220 mg/l concentration are passed through the device in parallel and simultaneously with a 20% aqueous solution of sodium hydroxide (phase R). The two solutions passed through the device are of phase ratio 120:1. An intermediate phase (S) is used. The chromium content of the two aqueous solutions at the device outlet is 0.0008 g/l and 26.3 g/l, respectively.

EXAMPLE 14

Sulphuric acid solution (phase F) containing 0.015 g/l of rhenium (VII) is passed through the device in parallel and simultaneously with a 2N aqueous solution of sodium hydroxide (phase R) in a flow rate ratio of 50:1. The intermediate phase (S) consists of a 2% solution of tributyl phosphate in normal paraffins ($C_{13}$-$C_{15}$)/ A 98% extraction of rhenium is achieved and the solution at the device outlet contains 0.0003 g/l of rhenium.

EXAMPLE 15

Industrial waters containing 0.7 g/l of molybdenum (phase F) are treated in the device with a 20% aqueous solution of sodium hydroxide (phase R) in the presence of 1% solution of trioctylamine in kerosene as the intermediate phase (S). The flow rate ratio F:R is 50:1, respectively. The molybdenum is concentrated in the phase R, which at the device outlet contains 32 g/l of molybdenum.

EXAMPLE 16

A water extract of santonine (phase F) with concentration of about 0.5 g/l is passed through the device in parallel and simultaneously with a stream of 10% solution of sodium hydroxide (phase R) using a mixture of chloroform and decane in a ratio 1:5 as the intermediate phase (S). A phase ratio F:R=40:1 results in 92% extraction of santonine said santonine being concentrated in phase R in the form of sodium salt.

Although the invention is illustrated and described with reference to a plurality of embodiments thereof, it is to be expressly understood that it is in no way limited to the disclosure of such preferred embodiments but is capable of numerous modifications within the scope of the appended claims. In the specification and claims, "solid surfaces being wettable", "hydrophilic surfaces", and "film carriers" are all equivalent terms.

REFERENCES

1. Li N. N. AICHEJ, (1971), 17, 459 American Institute of Chemical Engineers Journal
2. Kitagawa T., Y. Nishikawa, J. Frankenfeld, N. N. Li, Envir. Sci. and Techn., (1977) 11, 602 Environmental Science of Technology.
3. Boydzhiev L., Proceed. Intern. Congr. CHISA 81, Prague (1981)
4. Boyadzhiev L., G. Kyuchonkov, J. Membr. Sci. (1980)6, 107
5. Nekovar P., J. Cernohlavek, Proceed.CHISA'79, Mar.Lazne (1979)
6. Cussler E. L. AICHEJ., (1971), 17, 1300 American Institute of Chemical Engineers Journal
7. Nakashio F., K. Kondo, Sep.Sci. and Techn. (1980). 15, 1171 Separation Science and Technology
8. Bulgarian Authorship Certification 29607

I claim:

1. Method for mass transfer between three liquid phases wherein two of such phases are miscible and the other one of said phases is immiscible with respect to the other two phases and serves as an intermediate phase, comprising flowing the two miscible liquids down surfaces which are wettable by said immiscible liquids, said surfaces being separated by a space occupied by the third, intermediate phase, said third phase being forcibly circulated.

2. Method according to claim 1, wherein the third, intermediate phase flows in an upward direction.

3. Method according to claim 2, wherein the surfaces wetted by the two miscible liquids take-up, transport, and discharge said two miscible liquid phases in a capillary-gravitation mode.

4. Apparatus for the simultaneous mass transfer between three liquid phases, wherein two of such phases are miscible and the other one of said three phases is immiscible with the other two phases, said apparatus comprising a housing containing a package of vertically disposed alternating film carriers, distributors for the treated phase and the receiving phase, respectively, and discharge collector for the treated phase and the receiving phase, respectively, said distributors being located at the top end and said collectors being located at the bottom end of the housing, respectively, the two miscible liquids flowing down surfaces of the film carriers which are wettable by said immiscible liquids, and means for forcibly circulating the third, immiscible liquid in an upward direction.

5. Apparatus according to claim 4, wherein the film carriers are divided by separating nets.

* * * * *